Sept. 19, 1939. A. SCHÜTTE 2,173,595
TURBINE DRIVEN BLOWER
Filed March 23, 1938
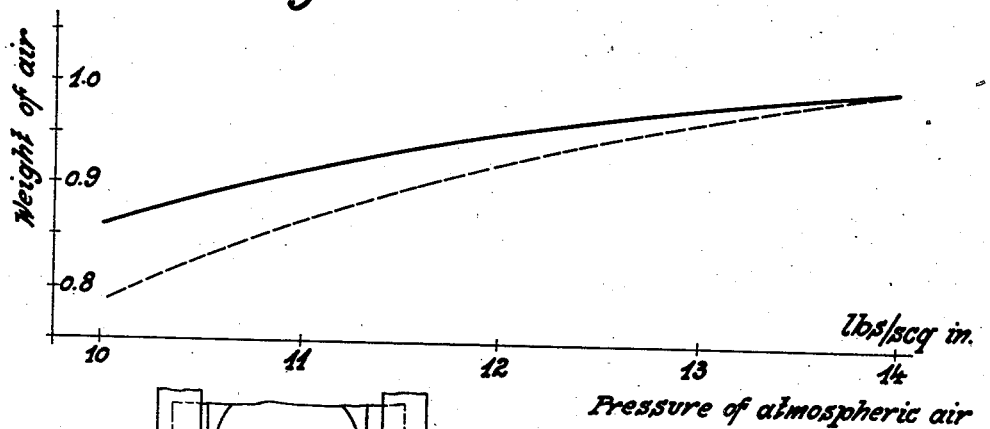
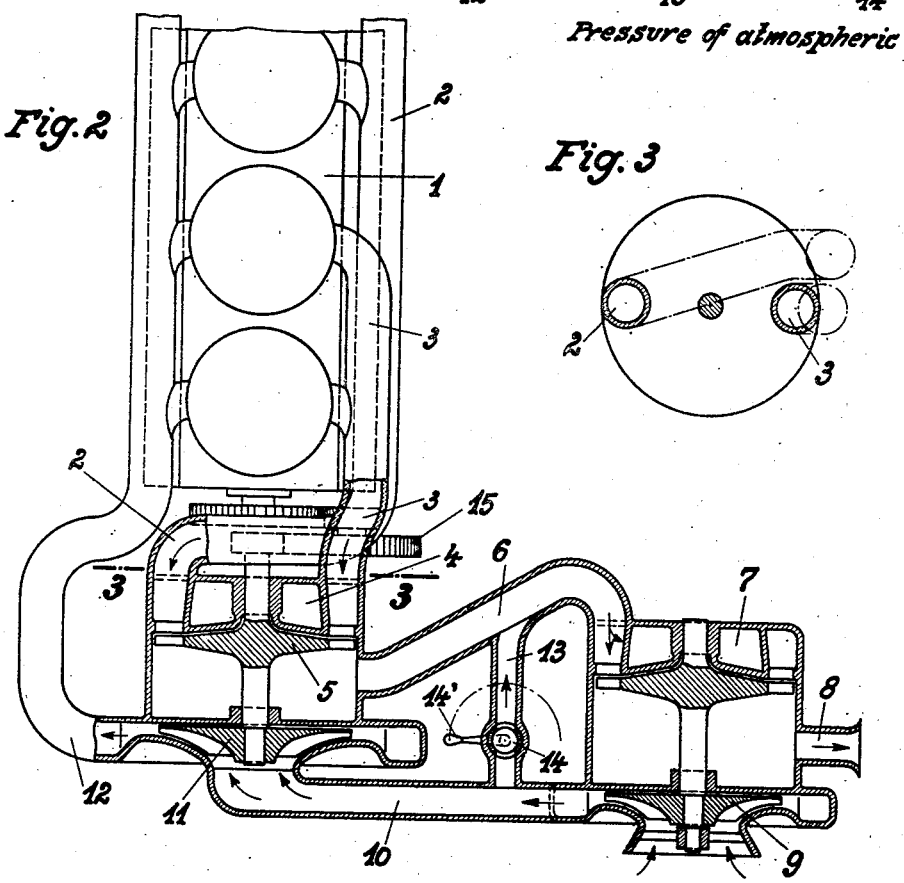
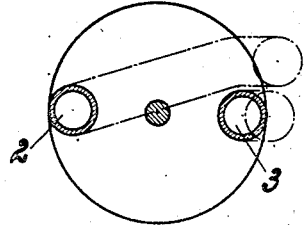
Inventor
Alfred Schütte
by Maréchal & Noe
attys.

Patented Sept. 19, 1939

2,173,595

UNITED STATES PATENT OFFICE 2,173,595

TURBINE DRIVEN BLOWER

Alfred Schütte, Augsburg, Germany, assignor to Maschinenfabrik Augsburg-Nurnberg A. G., Augsburg, Germany, a corporation of Germany Application March 23, 1938, Serial No. 197,619
In Germany March 25, 1937

5 Claims. (Cl. 60—13)

This invention relates to exhaust driven turbine blowers operated by the exhaust gases of an internal combustion engine or the like.

One object of the invention is the provision of an exhaust driven turbine blower, operated by the exhaust gases of an internal combustion engine and supplying air to the engine, the exhaust gases from the turbine being used to operate a second turbine which drives a second blower cooperatively associated with the first blower.

Another object of the invention is the provision of an exhaust driven turbine which is mechanically connected to the engine which furnishes the exhaust gas supply for the turbine, and in which the air supplied to the blower comes from a second turbine driven blower.

Another object of the invention is the provision of an exhaust driven turbine operated by the exhaust gases of an internal combustion engine and driving a blower which furnishes the air supply to the engine, the exhaust gases being supplied to the turbine from separate nozzle chambers in a constant or unregulated manner, the regulation of the air pressure being obtained by controlling a second turbine driven blower which furnishes the air supply to the first blower.

Other objects and advantages of the invention will be apparent from the following description, the appended claims, and the accompanying drawing, in which, Fig. 1 is a diagrammatic showing of the drop in weight of the air supplied by a turbine blower operating with different atmospheric pressure conditions.

Fig. 2 is a top plan view shown partly in central horizontal section and illustrating an exhaust driven turbine drive embodying the present invention; and Fig. 3 is a vertical section taken on the line 3—3 of Fig. 2.

In order to increase the pressure of the air supplied to an internal combustion engine such as an aircraft engine, adapted to operate under conditions in which the air pressure is less than normal atmospheric pressure, exhaust driven turbine blowers have been employed, the turbine being driven from the exhaust gases of the engine and operating the blower which supplies air at more or less constant pressure to the engine. This air, in the case of Diesel engines, is used for scavenging and for furnishing the combustion air supplied to the different engine cylinders. In this way the power output of the engine is high, even at high altitudes, although there is some drop in the efficiency because of the power requirements of the turbine driven blower itself. Thus, as shown in Fig. 1, the solid line curve shows the drop in weight of the air supplied by exhaust driven turbine blowers with constant adiabatic efficiency at various external air pressures, the vertical component of the curve representing the weight of the air, as based on normal atmospheric pressure, and the horizontal component of the curve representing atmospheric pressure. The dotted line curve shows a considerable loss in efficiency from 50% to 45% at high altitudes. Under constant load and temperature conditions, the variation of external air pressure is an indication of the variation of the power output of the engine.

In accordance with the present invention two exhaust gas turbine blowers are provided to furnish air at practically constant pressure at different altitudes to an internal combustion engine such as an aircraft engine or a Diesel engine of a mountain locomotive. The exhaust gas conduits 2 and 3 of the combustion engine 1 are separate conduits leading from different engine cylinders to separate nozzle chambers of the exhaust gas turbine 4 the exhaust flow from the engine thus being divided appropriately according to the firing sequence of the cylinders so that the successive exhaust streams from the engine pass into different conduits. These exhaust gases drive the turbine wheel 5, and after discharging from the turbine wheel are supplied through the conduit 6 to a second gas turbine 7. The exhaust gases from the turbine 7 flow out to the atmosphere through the outlet 8. The turbine wheel of the turbine 7 is connected to a blower 9 which receives air from the atmosphere and increases the pressure of the air, which it supplies through the conduit 10 to the blower 11 connected to the turbine wheel 5. The air compressed by blower 9 is thus compressed further by blower 11 before it is supplied through the conduit 12 at substantially constant pressure. This air is used for combustion air of the engine cylinders, and also, in the case of Diesel engines, for scavenging the exhaust gases from the engine cylinders.

The turbine 7 which is preferably although not necessarily a single stage turbine, has a single common nozzle chamber from which the gases are supplied to the turbine blades. The pressure of the air supplied through the conduit 10 from the second blower to the first blower is readily controlled so as to maintain the pressure of the air constant at this point at higher altitudes corresponding to normal atmospheric pressure. This control may be effected in any suitable manner, as by means of a conduit 13 and a controllable valve 14 operated by a handle 14' which may be moved to vary or shut off a flow of fresh air from the conduit 10 to the conduit 6. This air control valve provides a control by which the pressure of the air supply to the engine may be kept uniform, and is the only air pressure control required. The supply of exhaust gases from the engine to the first turbine 4 is a constant or unregulated supply so that the use of the complicated and weight-increasing devices that would otherwise be required for each separate nozzle supply compartment of the first turbine is quite unnecessary. Individual controls for the separate nozzle supply chambers of the first turbine would be quite objectionable not only because of the resultant weight increase but also because if fresh air is supplied to the exhaust gas supply of the turbine 4 the exhaust gases, at the time of maximum pressures in the exhaust gas manifolds may flow outward through the fresh air supply passage and produce rapid changes in the direction of flow in those passages. In accordance with the present invention, the supply of exhaust gases coming from the internal combustion engine to the first turbine 4 is efficiently utilized by that turbine, and instantaneous variations in the pressure of the engine exhaust are smoothed out by it so that the supply of exhaust gases to the second turbine 7 is at practically constant pressure. This second turbine therefore requires but a single common nozzle chamber and a single fresh air supply to that chamber or other equivalent control in order to govern the pressure of the air supplied from the second blower 9. Furthermore this single control furnished for the second turbine 7 is simplified because the exhaust gases in the conduit 6 are at a lower temperature than the exhaust gases coming from the engine because of the previous expansion of the exhaust gases in the first turbine 4. The air supplied to the conduit 10 may thus be controlled so as to have a constant pressure corresponding to normal atmospheric pressure regardless of altitude.

As shown in Fig. 2, the shaft of the turbine wheel 5 of the first turbine is mechanically connected to the engine shaft by suitable gearing 15. Where the energy of the exhaust gases supplied from the engine 1 is not quite sufficient to furnish the sole drive of the blowers, as in cases where the engine is idling, or at the time of landing of an aircraft, an adequate supply of power to the turbine is assured. The mechanical coupling between the engine crank shaft and the first blower is also of advantage in case of failure of one or both of the exhaust gas turbines, the mechanical connection further functioning to transmit any surplus energy developed by the turbine to the engine crank shaft.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. In combination, an internal combustion engine, an exhaust driven turbine, means for supplying the exhaust gases of the engine to said turbine in an unchangeable manner, a blower operated by said turbine and supplying compressed air to said engine, a second turbine in series with said first turbine and operated by the exhaust gases from said first turbine, a second blower operated by said second turbine and receiving its supply from the atmosphere, means for supplying air compressed by said second blower to the inlet of the first blower, and control means independent of said first turbine operable to govern the work done by said second turbine for controlling the pressure of the air supplied to said first blower.

2. In combination, an internal combustion engine, an exhaust driven turbine, means for supplying the exhaust gases of the engine in an unchangeable manner to said turbine, a blower operated by said turbine and supplying compressed air to said engine, a second turbine operated by the exhaust gases from the first turbine, a second blower operated by said second turbine and receiving its supply from the atmosphere, means for supplying air compressed by said second blower to the inlet of the first blower, and control means operable to govern the pressure of the air supplied to said first blower.

3. In combination, an internal combustion engine, an exhaust driven turbine having a plurality of separate gas supply chambers in closed communication with different engine cylinders for separately supplying exhaust gases from different engine cylinders to the turbine, a blower operated by said turbine, means for supplying air compressed by said blower to said engine, a second turbine operated by the exhaust gases from the first turbine, a second blower operated by said second turbine, means for supplying air compressed by said second blower to the inlet of the first blower, and means independent of the first turbine for regulating the work done by the second turbine.

4. In combination, an internal combustion engine, an exhaust driven turbine, means for supplying said turbine with the exhaust gases of said engine, a blower operated by said turbine, means for supplying air compressed by said blower to said engine, means forming a mechanical driving connection between the engine and the turbine, a second turbine operated by the exhaust gases from the first turbine, a second blower operated by said second turbine, and means independent of the first turbine for regulating the second turbine.

5. In combination, an internal combustion engine, an exhaust driven turbine, means for separately supplying exhaust gases from different engine cylinders to said turbine, a blower operated by said turbine, means for supplying air compressed by said blower to said engine, means for mechanically interconnecting said turbine with said engine, a second turbine operated by the exhaust gases from the first turbine, a second blower operated by said second turbine and receiving its supply from the atmosphere, the second blower and the second turbine being mechanically independent of the first blower and the first turbine, and means for supplying air compressed by said second blower to the inlet of the first blower.

ALFRED SCHÜTTE.